United States Patent [19]

Kejha et al.

[11] Patent Number: 5,521,023
[45] Date of Patent: May 28, 1996

[54] COMPOSITE ELECTROLYTES FOR ELECTROCHEMICAL DEVICES

[76] Inventors: Joseph B. Kejha; Stephen F. Hope, both of c/o Hope Technologies, Inc. 3701 Welsh Rd., Willow Grove, Pa. 19090-1293

[21] Appl. No.: 286,345

[22] Filed: Aug. 5, 1994

Related U.S. Application Data

[63] Continuation-in-part of Ser. No. 1,145, Jan. 7, 1993, Pat. No. 5,378,558, which is a continuation-in-part of Ser. No. 775,100, Oct. 11, 1991, abandoned, which is a continuation-in-part of Ser. No. 568,170, Aug. 16, 1990, Pat. No. 5,102,752.

[51] Int. Cl.$^6$ ................................................... H01M 2/14
[52] U.S. Cl. .......................... 429/142; 429/190; 429/192
[58] Field of Search ........................... 429/129, 142, 429/190, 192; 204/282; 252/62.2

[56] References Cited

U.S. PATENT DOCUMENTS

| 4,618,545 | 10/1986 | Clegg et al. | 429/142 X |
| 5,102,752 | 4/1992 | Hope et al. | 429/192 |
| 5,372,689 | 12/1994 | Carlson et al. | 204/282 X |
| 5,378,558 | 1/1995 | Hope | 429/192 |

*Primary Examiner*—Stephen Kalafut
*Attorney, Agent, or Firm*—Z. T. Wobensmith, III

[57] ABSTRACT

A solid state polymer electrolyte composite which is formed by coating an inert electrically insulating ribbon or sheet of expanded or perforated plastic film with a liquid, ion-conductive polymer, and curing the polymer to form a solid state or semi-solid state electrolyte composite.

26 Claims, 1 Drawing Sheet

COMPOSITE ELECTROLYTES FOR ELECTROCHEMICAL DEVICES

CROSS REFERENCE TO RELATED APPLICATIONS

This application is a continuation in part of prior application Ser. No. 08/001,145 filed Jan. 7, 1993, now U.S. Pat. No. 5,378,558 which is a continuation in part of application Ser. No. 07/775,100, now abandoned, filed Oct. 11, 1991 entitled "Solid State Composite Electrolytes for Batteries and the Like", which was a continuation in part of application Ser. No. 07/568,170, filed Aug. 16, 1990, now U.S. Pat. No. 5,102,752.

BACKGROUND OF THE INVENTION

1. Field of the Invention

This invention relates to solid and semi-solid state electrolyte composites which contain an electrically insulating ribbon or sheet of expanded or perforated plastic which is coated with an ion conductive solid or semi-solid state matrix, and solidified by an alkali metal triflate salt, or an alkaline earth metal triflate salt and a radiation curable polymer.

2. Description of the Prior Art

In the prior art various polymers have been used as components of the electrolytes of solid state alkali metal, and alkaline earth metal batteries, and various other kinds of electrochemical devices.

Among the problems associated with the use of these polymers in electrolytes is that they have inherent relatively low ionic conductivity, and also may react with the alkali metals used, such as lithium, or other metallic anodes, to form a non-conductive boundary layer, which prevents the free flow of ions and hinders rechargeability.

Various solutions have been proposed such as described in the U.S. Patents to Hope et al., U.S. Pat. No. 5,102,752; Schwabet et al., U.S. Pat. No. 4,792,504; Ballard et al., U.S. Pat. No. 4,822,701; Bauer et al., U.S. Pat. No. 4,654,279; Lee et al., U.S. Pat. No. 4,830,939; and Lee et al., U.S. Pat. No. 4,990,413.

The prior art polymer containing electrolytes also have exhibited poor adherence to the electrodes, are not flexible and do not possess sufficient mechanical strength to prevent shorting under pressure, or punching through of dendrites and consequent shorting of the device.

While electrically insulating fibrous structures in solid ribbon or mesh form are used in composite electrolytes, and are satisfactory for their intended purpose, the fibrous nonwoven fabrics are usually of 1.5 mils or more thickness, are bulky, and also cost more than are optimal. None of the prior art patents suggests, discloses or describes the composite electrolytes described herein.

The composite electrolytes of the invention do not suffer from prior art problems and provide many positive advantages.

SUMMARY OF THE INVENTION

It has now been found that, solid or semi-solid state electrolytes which are highly ion conductive, shorting-proof, dendrite-proof, flexible yet mechanically strong, lightweight, and inert to component materials, can be made by using a composite construction, where an electrically insulating material, preferably a ribbon or sheet of expanded or perforated plastic film, is coated with a liquid ion conductive material, which is solidified by using an alkali metal triflate salt, such as lithium triflate salt with polyethylene oxide (PEO) alone, or by an alkaline earth metal triflate salt with a radiation curable polymer to form a solid state ionically conductive matrix.

The principal object of the invention is to provide solid or semi-solid state composite electrolytes for batteries, capacitors and other electrochemical devices, which include an electrically insulating ribbon or sheet of lightweight expanded or perforated plastic film embedded in an ionically conductive matrix.

A further object of the invention is to provide composite electrolytes of the character aforesaid that are inert to the component materials used in various electrochemical devices.

A further object of the invention is to provide composite electrolytes of the character aforesaid that have excellent adherence and low shrinkage properties.

A further object of the invention is to provide composite electrolytes of the character aforesaid, that are flexible, tough and resistant to dendrite formation, easy to handle and lend themselves to mass production.

A further object of the invention is to provide composite electrolytes of the character aforesaid that are thinner than existing composite electrolytes and provide greater energy density.

A further object of the invention is to provide composite electrolytes of the character aforesaid that are lightweight, mechanically strong, and resist shorting under pressure.

A further object of the invention is to provide composite electrolytes of the character aforesaid that are highly stable at elevated temperatures, and allow rapid processing.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawing forming part hereof in which.

It should of course be understood that the description and drawing herein are merely illustrative and that various modifications and changes can be made in the structures disclosed without departing from the spirit of the invention.

DESCRIPTION OF THE PREFERRED EMBODIMENTS

Electrochemical devices such as alkali or alkaline earth metal batteries, and for example lithium batteries, consist of at least an anode layer, a polymer electrolyte layer, and a cathode layer. Such devices can be of virtually any desired size and configuration, and usually include additional layers such as current conducting backing layers, insulating layers and electrode connection layers.

The polymer dielectric or electrolyte layer must be compatible with the component materials used to fabricate the devices while possessing suitable ionic conductivity.

Figure 1:
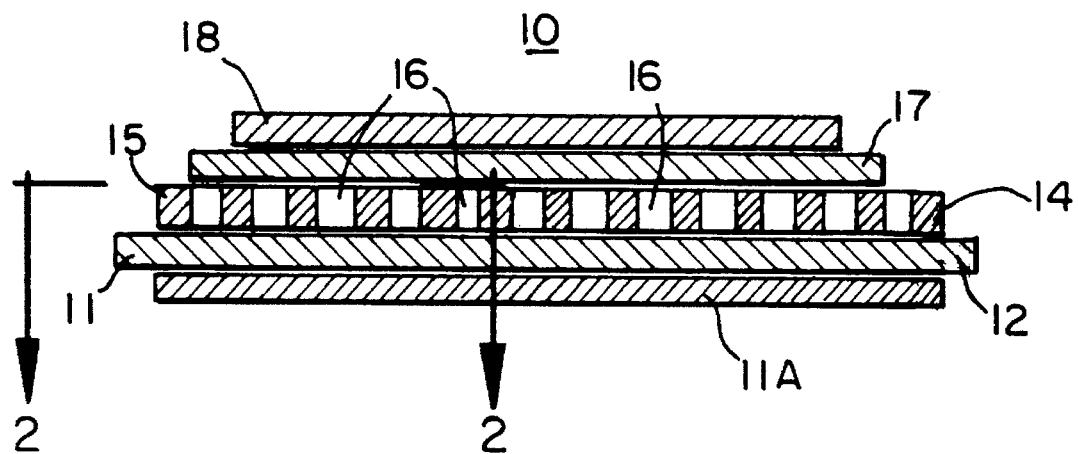
FIG. 1 is a diagrammatic view of an electrochemical device, such as a battery constructed in accordance with the invention.
Figure 2:
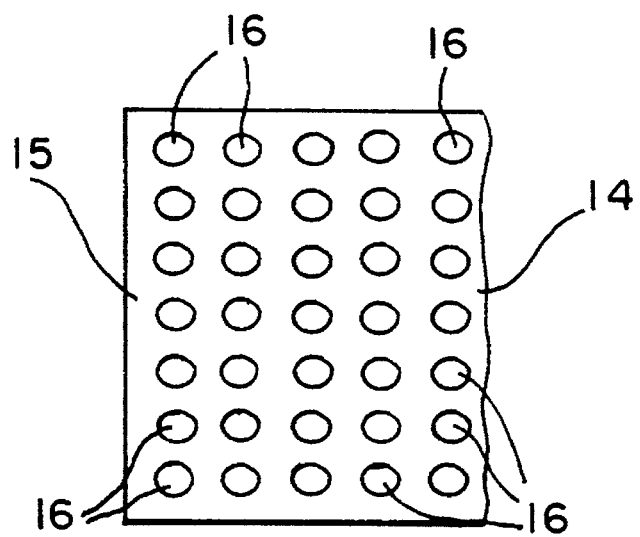
FIG. 2 is a vertical sectional view, enlarged, taken approximately on the line 2—2 of FIG. 1.

Referring now more particularly to the drawings and FIGS. 1 and 2, in the device described herein, which is a battery 10 of the lithium metal type, a base 11 is provided which includes a web of material 11A, such as nickel foil or a ribbon of expanded or perforated metallized plastic film coated with a cathode material 12.

The cathodic material 12 is of well known type, and which may include finely ground particles of an intercalation compound such as vanadium oxide compound ($V_6O_{13}$), mixed with an organic solvent, polymer, alkali salt, and carbon black.

The cathode material 12 may then have an additional layer 14 of solid state polymeric electrolyte composite applied thereto, which composite may include an electrically non-conductive ribbon 15 of expanded plastic or perforated film material which is inert to the battery components and is preferably of polypropylene, but other materials such as polyethylene, polyester, ethylenetetrafluoroethylene, polytetrafluoroethylene, polyvinylchloride, polyvinylfluoride and their variations are also suitable.

The ribbon 15 has a plurality of holes 16 therein which can be formed by punching, punching and expanding, or other suitable manufacturing methods. The ribbon 15 can have up to approximately 90% (percent) air holes, dependent upon the material used and the requirements of the device. The ribbon 15 can be of a thickness of 0.06 mil which is 1/25 of the thickness of an equivalent plastic fiber based ribbon (not shown).

The ribbon 15 may also be of a punched and expanded, or perforated porous plastic film membrane as shown in FIG. 2 such as Celguard of polypropylene, Teflon, polyethylene and other materials, made by Hoechst-Celanese Corp.

The ribbon 15 is coated with polymeric material 17, such as polyethylene oxide and an ester such as propylene carbonate (PC), ethylene carbonate (EC), and dimethyl-carbonate (DMC) compounded with lithium trifluoromethane sulfonate, and which is also referred to as lithium triflate.

An additional layer 18 of well known anode material is applied on top of the electrolyte layer.

The resultant battery can be provided with other layers as desired.

A solid state polymeric electrolyte composition which is suitable, for example, for lithium batteries, capacitors, electrochromic devices, sensors, fuel cells, memory devices, and devices for brine electrolysis by an ion exchange method, contains propylene carbonate (PC) in the range of 10% to 90% by weight; 1,2-dimethoxyethane (DME) in the range of 0.2% to 90% by weight; an ion conductive salt such as lithium triflate in the range of 1% to 90% by weight; and polyethylene oxide (PEO) in the range of 0.2% to 60% by weight. The PC can be replaced by any suitable ester, or ether or pyrrolidinone of the same percentage weight range.

The PC can also be replaced by a plurality of ion conductive esters, or a combination of esters, ethers and pyrrolidinones which provides improved conductivity and cyclability.

Suitable esters would be propylene carbonate, ethylene carbonate, butylene carbonate, dimethylcarbonate and diethylcarbonate.

Suitable ethers would be 1,2-dimethoxypropane; 1,2-dimethoxyethane; tetrahydrofuran; 2-methyl tetrahydrofuran; and polyethylene glycol dimethyl ether.

A suitable pyrrolidinone would be 1,5 dimethyl-2, pyrrolidinone; and n-methyl pyrrolidinone.

These and other suitable esters, ethers and pyrrolidinones can be substituted in the same total percentage weight range as the PC and/or DME they replace. An additional alkali metal salt such as lithium hexafluorophosphate ($LiPF_6$) may be added in the range of 0.1% to 50% (percent) by weight.

The described composition is heated to 70° C. and the ribbon or sheet of expanded or perforated plastic film is dipped into the composition, coated and withdrawn, and then the composition is solidified by cooling it to 33° C. or less, and by the presence of lithium triflate as described in prior U.S. patent application Ser. No. 07/632,971 filed Dec. 24, 1990. If a radiation curable polymer is also used, the impregnated composite is irradiated by UV light, or electron beam radiation before cooling as described in U.S. Pat. No. 5,006,531.

It should be noted that, for other electromechanical devices, the lithium triflate salt should be replaced by a corresponding triflate salt to match the elected alkali or alkaline earth metal.

Preferred embodiments of the invention are illustrated in the following examples:

EXAMPLE #1

A sample of polymeric electrolyte composite was formed by compounding a lithium salt and a polymeric material which consisted of 42.75% (percent) by weight of propylene carbonate (PC), 42.75% (percent) by weight of tetrahydrofuran (THF), 11% (percent) by weight of lithium triflate and 3.5% (percent) by weight of polyethylene oxide (PEO).

The mixture was heated to 70° C. and became liquid, a ribbon of expanded polytetrafluoroethylene film was dipped into the hot liquid. The hot coated ribbon was applied to an electrode layer, and by cooling it to 33° C. or less, solidified due to the presence of the lithium-triflate and formed a solid or semi-solid, ion conductive layer of the desired thickness, strength and adherence.

EXAMPLE #2

Another example of polymeric electrolyte composite was formed by compounding a lithium salt and a polymeric material, which consisted of 36.6% (percent) by weight of PC, 36.6% (percent) by weight of DME, 10% (percent) by weight of lithium triflate, 1.8% (percent) by weight of PEO and 15% (percent) by weight of a radiation curable polymer such as Envibar UV-1244.

The mixture was heated to 70° C. and became liquid, a ribbon of perforated polyethylene film was coated with the hot mixture. The hot coated ribbon was applied to an electrode layer and exposed to ultraviolet radiation while still hot, which caused it to crosslink. The composite was then cooled to 27° C. or less and formed a solid or semi-solid ion conductive layer of desired thickness, strength and adherence.

EXAMPLE #3

Another example of polymeric electrolyte composite was formed by combining a lithium salt and a polymeric material, which consisted of 57% (percent) by weight of EC, 28.5% (percent) by weight of DMC, 11% (percent) by weight of lithium triflate, and 3.5% (percent) by weight of PEO.

The mixture was heated to 70° C. and became liquid, a ribbon of expanded Tefzel (ethylenetetrafluoroethylene) film was coated with the hot mixture, and the hot coated ribbon was applied to an electrode layer. The described composite was then cooled to 33° C. or less and solidified due to the presence of lithium triflate and formed a solid or semi-solid ion conductive layer of desired thickness, strength and adherence.

EXAMPLE #4

Another example of polymeric electrolyte composite was formed by combining a lithium salt and a polymeric material, which consisted of 57% (percent) by weight of DMC, 28.5% (percent) by weight of EC, 11% (percent) by weight of lithium triflate, and 3.5% (percent) by weight of PEO.

The mixture was heated to 70° C. and became liquid, a ribbon of expanded polypropylene film was coated with the hot mixture, and the hot coated ribbon was applied to an electrode layer. The described composite was then cooled to 33° C. or less and solidified due to the presence of lithium triflate and formed a solid or semi-solid ion conductive layer of desired thickness, strength and adherence.

EXAMPLE #5

Another example of polymeric electrolyte composite was formed by combining a lithium salt and a polymeric material, which consisted of 38.45 (percent) by weight of DMC, 38.45% (percent) by weight of EC, 9.9% (percent) by weight of lithium triflate, 9.0% (percent) by weight of lithium-hexafluorophosphate ($LiPF_6$), and 4.2% (percent) by weight of PEO.

The mixture was heated to 70° C. and became liquid, a ribbon of expanded polyester film was coated with the hot mixture, and the hot coated ribbon was applied to an electrode layer. The described composite was then cooled to 33° C. or less and solidified due to the presence of lithium triflate and formed a solid or semi-solid ion conductive layer of desired thickness, strength and adherence.

The described materials, and preferably, polytetrafluoroethylene or ethylenetetrafluoroethylene are especially inert to battery chemistry and thus improve the battery cyclability. The described polytetrafluoroethylene, is also known under the trademark "Teflon", and ethylenetetrafluoroethylene is known under the trademark "Tefzel". It should be apparent that any other ion-conductive polymer matrices may be applied to the described expanded or perforated plastic films or sheets to obtain similar or equivalent composite electrolytes.

It is thus apparent that compositions have been described with which the objects of the invention are achieved.

We claim:

1. A solid or semi-solid state electrolyte composite for electrochemical devices wherein the electrolyte composite comprises an electrically insulating ribbon of expanded plastic film which has been coated with and is embedded in an ionically conductive solid or semi-solid state matrix, and said solid or semi-solid state matrix includes an ion conductive liquid which has been complexed with an alkali metal, or alkaline earth metal trifluoromethane sulfonate salt and polyethylene oxide.

2. A solid or semi-solid state electrolyte composite for electrochemical devices wherein the electrolyte composite comprises an electrically insulating ribbon of perforated plastic film which has been coated with and is embedded in an ionically conductive solid or semi-solid matrix, and said solid or semi-solid state matrix includes an ion conductive liquid which has been complexed with an alkali metal or alkaline earth metal trifluoromethane sulfonate salt and polyethylene oxide.

3. A composite as defined in claims 1 or 2 in which said matrix additionally contains a radiation curable polymer.

4. A composite as defined in claims 1 or 2 in which said plastic film is polypropylene.

5. A composite as defined in claims 1 or 2 in which said plastic film is polyethylene.

6. A composite as defined in claims 1 or 2 in which said plastic film is polyester.

7. A composite as defined in claims 1 or 2 in which said plastic film is ethylenetetrafluoroethylene.

8. A composite as defined in claims 1 or 2 in which said plastic film is polytetrafluoroethylene.

9. A composite as defined in claims 1 or 2 in which said plastic film is polyvinylfluoride.

10. A composite as defined in claims 1 or 2 in which said alkali metal trifluoromethane sulfonate is lithium trifluoromethane sulfonate.

11. A composite as defined in claims 1 or 2 in which said matrix contains propylene carbonate and 1, 2 Dimethoxyethane.

12. A composite as defined in claims 1 or 2 in which said matrix contains polyethylene glycol dimethyl ether.

13. A composite as defined in claims 1 or 2 in which said matrix contains butylene carbonate.

14. A composite as defined in claims 1 or 2 in which said matrix contains propylene carbonate and tetrahydrofuran.

15. A composite as defined in claims 1 or 2 in which said matrix contains ethylene carbonate and 2-methyl tetrahydrofuran.

16. A composite as defined in claims 1 or 2 in which said matrix contains at least one ester.

17. A composite as defined in claims 1 or 2 in which said matrix contains at least one ether.

18. A composite as defined in claims 1 or 2 in which said matrix contains at least one pyrrolidinone.

19. A composite as defined in claims 1 or 2 in which said matrix contains at least one ester and one ether.

20. A composite as defined in claims 1 or 2 in which said matrix contains at least one pyrrolidinone and at least one ether.

21. A composite as defined in claims 1 or 2 in which said matrix contains propylene carbonate and 1,2-Dimethoxypropane.

22. A composite as defined in claims 1 or 2 in which said matrix contains 1,5 dimethyl-2, pyrrolidinone and 1,2 dimethoxyethane.

23. A composite as defined in claims 1 or 2 in which said matrix contains ethylene carbonate and dimethyl carbonate.

24. A composite as defined in claim 1 or 2 in which said matrix contains ethylene carbonate and diethyl carbonate.

25. A composite as defined in claims 1 or 2 which additionally contains lithium hexafluorophosphate salt.

26. A composite as defined in claims 1 or 2 in which said expanded or perforated plastic film is of porous plastic material.

* * * * *